United States Patent
Sinow et al.

(10) Patent No.: US 11,824,445 B2
(45) Date of Patent: *Nov. 21, 2023

(54) SYSTEMS AND METHODS FOR AUTOMATIC DETERMINATION OF STATE OF SWITCHES IN POWER CONVERTERS

(71) Applicant: Navitas Semiconductor Limited, Dublin (IE)

(72) Inventors: Victor Sinow, Fresno, CA (US); Weijing Du, Torrance, CA (US)

(73) Assignee: Navitas Semiconductor Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/150,600

(22) Filed: Jan. 5, 2023

(65) Prior Publication Data
US 2023/0155503 A1 May 18, 2023

Related U.S. Application Data

(63) Continuation of application No. 17/667,335, filed on Feb. 8, 2022, now Pat. No. 11,575,321.

(60) Provisional application No. 63/147,603, filed on Feb. 9, 2021.

(51) Int. Cl.
*H02M 3/158* (2006.01)
*H02M 1/42* (2007.01)
(Continued)

(52) U.S. Cl.
CPC .......... *H02M 3/158* (2013.01); *H02M 1/0009* (2021.05); *H02M 1/08* (2013.01); *H02M 1/4208* (2013.01)

(58) Field of Classification Search
CPC ............. H02M 1/0006; H02M 1/0009; H02M 1/0048; H02M 1/0058; H02M 1/08; H02M 1/0088; H02M 1/4208; H02M 3/158

See application file for complete search history.

(56) References Cited

U.S. PATENT DOCUMENTS

| 6,674,656 | B1 | 1/2004 | Yang et al. |
| 10,075,073 | B2 | 9/2018 | Guan et al. |

(Continued)

FOREIGN PATENT DOCUMENTS

| CN | 103296904 A | 9/2013 |
| CN | 105305818 A | 2/2016 |

(Continued)

OTHER PUBLICATIONS

U.S. Appl. No. 17/667,335, "Notice of Allowance", dated Oct. 3, 2022, 9 pages.

(Continued)

*Primary Examiner* — Adolf D Berhane
(74) *Attorney, Agent, or Firm* — Kilpatrick Townsend & Stockton LLP

(57) ABSTRACT

Systems and methods that automatically detect state of switches in power converters are disclosed. In one aspect, a power switch includes a first switch coupled between a power input node and a first terminal of a load, a second switch coupled between the power input node and a second terminal of the load, first and second current sense devices arranged to transmit first and second signals including at least one of a magnitude and polarity of first and second currents through the first and second switches, respectively, a first driver circuit arranged to transmit first control signals to the first switch based at least in part on a voltage at the power input node and the first signal, and a second driver circuit arranged to transmit second control signals to the second switch based at least in part on the voltage at the power input node and the second signal.

20 Claims, 7 Drawing Sheets

(51) Int. Cl.
*H02M 1/08* (2006.01)
*H02M 1/00* (2006.01)

(56) References Cited

U.S. PATENT DOCUMENTS

| 10,199,833 | B1 | 2/2019 | Bucher et al. |
| 11,575,321 | B2 * | 2/2023 | Sinow .................. H02M 1/08 |
| 2011/0148377 | A1 | 6/2011 | Schiff et al. |
| 2013/0314958 | A1 | 11/2013 | Kern |
| 2016/0087518 | A1 | 3/2016 | Agarwal et al. |

FOREIGN PATENT DOCUMENTS

| CN | 105305848 A | 2/2016 |
| CN | 107370371 A | 11/2017 |
| CN | 104254957 B | 4/2018 |
| CN | 109891730 A | 6/2019 |
| CN | 110165883 A | 8/2019 |
| JP | 2013120837 A | 6/2013 |
| JP | 5962115 B2 | 7/2016 |
| TW | 201836232 A | 10/2018 |

OTHER PUBLICATIONS

TW111104799, "Office Action", dated Nov. 3, 2022, 6 pages.
U.S. Appl. No. 17/667,335, "Corrected Notice of Allowability", dated Jan. 9, 2023, 2 pages.
CN202210122595.2, "Office Action", dated Apr. 12, 2023, 9 pages.
TW111104799, "Notice of Decision to Grant", dated May 1, 2023, 2 pages.
CN202210122595.2 , "Notice of Decision to Grant", dated Sep. 4, 2023, 5 pages.

* cited by examiner

SYSTEMS AND METHODS FOR AUTOMATIC DETERMINATION OF STATE OF SWITCHES IN POWER CONVERTERS

CROSS-REFERENCES TO RELATED APPLICATIONS

This application claims priority to U.S. patent application Ser. No. 17/667,335, for SYSTEMS AND METHODS FOR AUTOMATIC DETERMINATION OF STATE OF SWITCHES IN POWER CONVERTERS," filed Feb. 8, 2022, which claims priority to U.S. provisional patent application Ser. No. 63/147,603, for "DYNAMIC ZCD THRESHOLD MODULATION" filed on Feb. 9, 2021, the contents of all of which are hereby incorporated by reference in their entirety for all purposes.

FIELD

The present disclosure relates generally to power conversion circuits, and in particular to power conversion circuits that automatically detect state of power switches that are used in the power conversion circuit.

BACKGROUND OF THE INVENTION

Electronic devices such as computers, servers and televisions, among others, employ one or more electrical power conversion circuits to convert one form of electrical energy to another. Some electrical power conversion circuits convert a high DC voltage to a lower DC voltage using a circuit topology called a half bridge converter. As many electronic devices are sensitive to size and efficiency of the power conversion circuit, new power converters can provide relatively higher efficiency and lower size for the new electronic devices.

SUMMARY

In some embodiments, a circuit is disclosed. The circuit includes a first switch coupled between a power input node and a first terminal of a load, a second switch coupled between the power input node and a second terminal of the load, a first current sense device arranged to transmit a first signal including at least one of a magnitude and polarity of a first current through the first switch, a second current sense device arranged to transmit a second signal including at least one of a magnitude and polarity of a second current through the second switch, a first driver circuit arranged to transmit first control signals to the first switch based at least in part on a voltage at the power input node and the first signal, and a second driver circuit arranged to transmit second control signals to the second switch based at least in part on the voltage at the power input node and the second signal.

In some embodiments, the first driver circuit includes a first threshold generation circuit and the second driver circuit includes a second threshold generation circuit.

In some embodiments, the first threshold generation circuit is arranged to generate a first threshold signal based on the voltage at the power input node.

In some embodiments, a value of the first threshold signal is based on a duty cycle of a pulse width modulated (PWM) signal received from a controller.

In some embodiments, the value of the first threshold signal is high when the duty cycle of the PWM signal is high.

In some embodiments, the value of the first threshold signal is low when the duty cycle of the PWM signal is low.

In some embodiments, the second threshold generation circuit is arranged to generate a second threshold signal based on the voltage at the power input node.

In some embodiments, a value of the second threshold signal is based on the duty cycle of the PWM signals received from the controller.

In some embodiments, the first threshold generation circuit includes a first PWM signals receiving circuit, and a first resistor coupled to a first current mirror circuit, the first current mirror circuit coupled to the first PWM signals receiving circuit.

In some embodiments, a method of operating a circuit is disclosed. The method includes switching first and second power switches to transfer power from an AC power input node to a load, receiving control signals for controlling operation of the first and second power switches, providing a first switch device including a first current sensor arranged to transmit a first signal indicating a polarity of a first current flowing through the first power switch, providing a second switch device including a second current sensor arranged to transmit a second signal indicating a polarity of a second current flowing through the second power switch, generating a reference voltage based on a voltage of the AC power input node, and transmitting a turn off signal to the first power switch when a voltage of the first signal is higher than the reference voltage.

In some embodiments, the transmitting the turn off signal to the first power switch occurs when the first signal is higher than the reference voltage and a turn off signal for the first power switch is received from a controller.

In some embodiments, the reference voltage is a first reference voltage and the turn off signal is first turn off signal, and the method further includes transmitting a second turn off signal to the second power switch when a voltage of the second signal is high than a second reference voltage In some embodiments, the transmitting the second turn off signal to the second power switch occurs when the second signal is higher than the second reference voltage and the second turn off signal for the first power switch is received from a controller.

In some embodiments, the generating the reference voltage based on the voltage of the AC power input node includes: receiving pulse width modulated (PWM) signals, and generating the reference voltage based on a value of a resistance of a first resistor and a duty cycle of the PWM signals.

In some embodiments, a power factor correction (PFC) circuit is disclosed. The PFC circuit includes a first power switch coupled between a switch node and a first terminal of a load, a second power switch coupled between the switch node and a second terminal of the load, a first current sense device arranged to transmit a first signal including at least one of a magnitude and polarity of a first current through the first power switch, a second current sense device arranged to transmit a second signal including at least one of a magnitude and polarity of a second current through the second power switch, a first driver circuit arranged to transmit first control signals to the first power switch based at least in part on a voltage at a power input node and the first signal, a second driver circuit arranged to transmit second control signals to the second power switch based at least in part on the voltage at the power input node and the second signal, and a controller arranged to transmit control signals to the first and second power switches.

In some embodiments, in the PFC circuit the first driver circuit includes a first threshold generation circuit and the second driver circuit includes a second threshold generation circuit.

In some embodiments, in the PFC circuit the first threshold generation circuit is arranged to generate the first threshold signal based on the voltage at the power input node.

In some embodiments, in the PFC circuit the first and second power switches are arranged to selectively connect the switch node to the first and second terminals of the load.

In some embodiments, in the PFC circuit the connecting of the switch node to the first terminal of the load is performed when the switch node is substantially at a same voltage as the first terminal of the load.

In some embodiments, in the PFC circuit the connecting of the switch node to the second terminal of the load is performed when the switch node is substantially at a same voltage as the second terminal of the load.

DETAILED DESCRIPTION OF THE INVENTION

Figure 1:
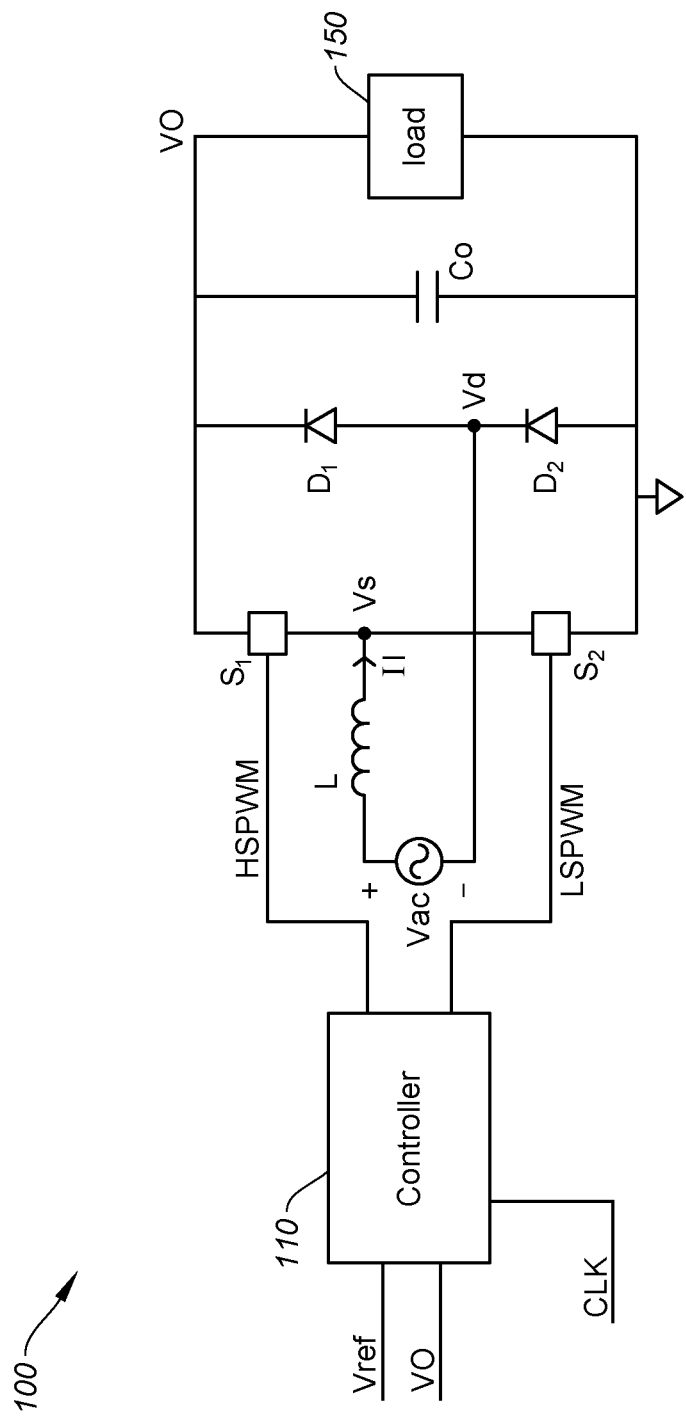
FIG. 1 is a simplified schematic of a power conversion circuit according to an embodiment of the disclosure.

Circuits and related techniques disclosed herein relate generally to power converters. More specifically, circuits, devices and related techniques disclosed herein relate to power conversion circuits that employ power switches that automatically can detect state of the power switches. In some embodiments, circuits, devices and related techniques disclosed herein can be used in totem pole bridgeless power factor correction (PFC) circuits to improve their operational efficiency by allowing for zero voltage switching (ZVS) of the power switches. In various embodiments, ZVS is achieved by determining whether a power switch is operating in a control mode or in a synchronous (sync) mode, and if the power switch is operating in sync mode, the power switch may not turn off in response to a control signal from a controller. Instead, the power switch may automatically and autonomously determine when to turn itself off in order to optimize an amount of current that can flow into a power conversion inductor such that the energy in the power conversion inductor can pull a switch node softly down to ground. In this way, hard switching of the switch node can be avoided, thereby increasing the operational efficiency of the totem pole bridgeless PFC.

In some embodiments, the determination of the mode of operation of a power switch (control or sync mode), and the optimization of the amount of current that may flow into the power conversion inductor can performed by generating a threshold signal that is based on an input line voltage, generating a current sense signal based on at least one of direction and a magnitude of a current flowing through the power switch. In various embodiments, the threshold signal may be based on a difference between the output voltage of the power converter and the input line voltage. The current sense signal can be compared to the threshold signal and if the current sense signal is less than the threshold signal, the power switch may not turn off in response to a control signal from the controller. Instead, the power switch can delay its turn off until the current sense signal exceeds the threshold signal.

The threshold signal can be based on an instantaneous value of the input line voltage when the output voltage of the power converter is at a fixed value. By having the threshold signal be based on the instantaneous value of the input line voltage, an amount of a reverse current flow into the power conversion inductor can be optimized in order to achieve ZVS, resulting in an increased efficiency of the power converter. In various embodiments, by having a capability to automatically and autonomously detect whether the power switch is operating in control or sync mode, computational loads on the controller can be reduced resulting in system cost reductions.

In some embodiments, the power switch may turn off immediately if it determines that it is in control mode, whereas if the power switch determines that it is in sync mode the switch may not turn off immediately. Instead, it may wait until a current through the power switch turns positive by a relatively small amount before it turns itself off. The relatively small amount of positive current is determined by the power switch automatically such that the inductor can charge up by an optimized amount of energy in order to be able to pull the switch node down to ground softly, i.e. achieve ZVS, resulting in an increased operational efficiency of the power converter.

Embodiments of the disclosure can enable a power converter to increase its operational efficiency while increasing a control loop bandwidth of the controller. A determination of an on-time of the synch switch can be performed autonomously by the power switch itself, thereby freeing the controller from performing this task, resulting in an increased control loop bandwidth because less calculation is performed by the controller during each control loop update. This can result in improved performance of the power converter. Further, a less complex controller may be utilized in the power converter, resulting in reduced system costs.

In some embodiments, the totem pole bridgeless PFC circuits can utilize one or more gallium nitride (GaN) devices, such as GaN power transistors. By utilizing GaN devices, embodiments of the present disclosure can enable the power converter to operate at relatively higher frequencies with relatively higher efficiencies than traditional silicon-based circuits, because GaN transistors may have relatively lower reverse recovery charge compared to their silicon counterparts. Various inventive embodiments are described herein, including methods, processes, systems, devices, and the like.

FIG. 1 is a simplified schematic of a power conversion circuit 100 receiving an AC power input from an AC source Vac, and providing power to a load 150 according to an embodiment of the invention.

Power conversion circuit 100 includes controller 110, input in inductor L, high side switch S1, low side switch S2, diode D1, diode D2, and output capacitor Co.

Diodes D1 and D2 may be implemented using any current rectifying structure, such as pn junction diode or as a diode connected transistor, as understood by those of skill in the art. Other current rectifying structures may be used, as understood by those of skill in the art. In some embodiments, diodes D1 and D2 may be implemented with switches which are actively controlled by controller 110, as understood by those of skill in the art.

Output capacitor Co may be implemented using any capacitor structure, such as two metal conductor plates separated by a dielectric or as one or more transistors having their drain and source terminals electrically shorted, where the drain/source terminal functions as a first plate of the capacitor and the gate of transistor functions as a second plate of the capacitor, as understood by those of skill in the art. Other capacitive structures may be used, as understood by those of skill in the art.

Controller 110 is configured to receive a reference voltage Vref and the output voltage VO of the power conversion circuit 100. As understood by those of skill in the art, in some embodiments, the controller 110 may be configured to receive a voltage generated based on the output voltage VO instead of the output voltage VO itself. Controller 110 is also configured to receive a clock signal CLK. Based on the clock signal CLK, the reference voltage Vref, and the output voltage VO, controller 110 is configured to generate control signals for each of high side switch S1 and low side switch S2. For example, controller 110 may be configured to generate pulse width modulation (PWM) signals which control the conductivity states of high side switch S1 and low side switch S2. Controller 110 may be configured to generate the control signals for high side switch S1 and low side switch S2.

Each of the high side switch S1 and the low side switch S2 can be configured to respond to the control signals received from controller 110 by becoming either conductive or nonconductive. In some embodiments, each of the high side switch S1 and the low side switch S2 are configured to become either conductive or nonconductive in response to the control signals and in response to an electrical condition of the high side switch S1 or the low side switch S2. For example, either or both of high side switch S1 and low side switch S2 may be configured to receive a control signal from the controller 110 and wait for a particular electrical condition to occur before becoming conductive or nonconductive according to the control signal.

As understood by those of skill in the art, the control signals include open control signals configured to cause either high side switch S1 or low side switch S2 to become nonconductive and close control signals configured to cause either high side switch S1 or low side switch S2 to become conductive.

The electrical condition may include, for example, that either high side switch S1 or low side switch S2 is conducting current, is not conducting current, or is conducting current specifically in either direction. In some embodiments, the electrical condition may include that either high side switch S1 or low side switch S2 is conducting a current which is greater or less than a threshold current.

In some embodiments, the electrical condition may additionally or alternatively include that either high side switch S1 or low side switch S2 has a voltage across its drain and source terminals which is greater or less than a threshold voltage.

In some embodiments, high side switch S1 may be configured to receive an open control signal from the controller 110 and become nonconductive in response to an electrical condition that the current through high side switch S1 is less than a threshold current. Accordingly, a delay duration occurs after the high side switch S1 receives the open control signal from the controller 110 before becoming nonconductive.

Additionally or alternatively, in some embodiments, low side switch S2 may be configured to receive an open control signal from the controller 110 and become nonconductive in response an electrical condition that the current through low side switch S2 is less than a threshold current. Accordingly, a delay duration occurs after the low side switch S2 receives the open control signal from the controller 110 before becoming nonconductive.

In current approaches, a controller may control the on and off times of the switches used in the power converter. In the present disclosure, the switches can automatically and autonomously detect the state of operation that they are in, i.e. control mode or sync mode. Further, if a switch determines it is operating in sync mode, it can turn off itself independent of a control signal from the controller commanding the switch to turn off. Instead, the sync switch can monitor a current flowing through its drain to source and turn itself off when the current changes direction and reaches a magnitude determined by an instantaneous value of input line voltage and a value of a resistance of a resistor.

Figure 2:
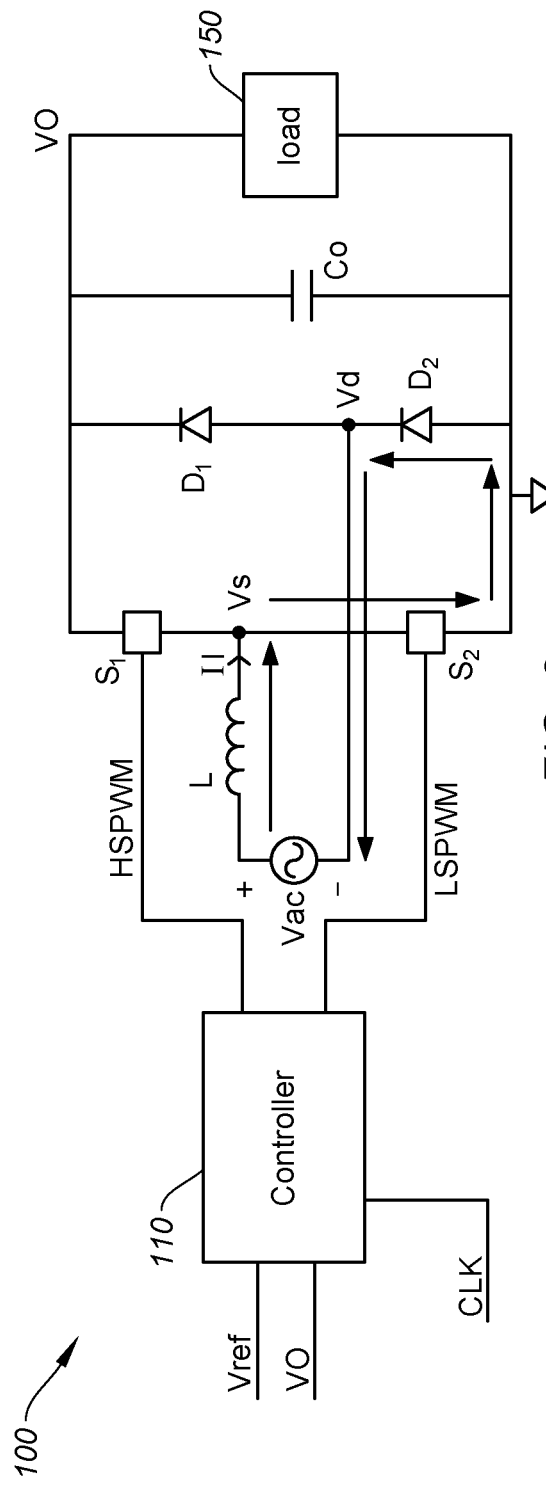
FIG. 2 is a simplified schematic illustration of an operating condition of the circuit of FIG. 1.

FIG. 2 is a simplified schematic illustration of an operating condition of the circuit of FIG. 1. While operating in the condition illustrated in FIG. 2, the AC power input signal is positive, high side switch S1 is nonconductive, and low side switch S2 is conductive.

Accordingly, as indicated in FIG. 2, the current flows through power conversion circuit 100 from the positive terminal of AC source of Vac through inductor L, through low side switch S2 in a positive direction, through diode D2, and to the negative terminal of AC source Vac.

While operating in the illustrated condition, in response to receiving an open control signal from controller 110 because the polarity of the AC power input signal is positive, current flows in the indicated direction, and low side switch S2 immediately or substantially immediately becomes nonconductive, or becomes nonconductive regardless of the state of an electrical condition of low side switch S2 which would cause a delay in other operating conditions. An embodiment of a switch which can be used as low side switch S2 is discussed below with reference to FIG. 6.

Figure 3:
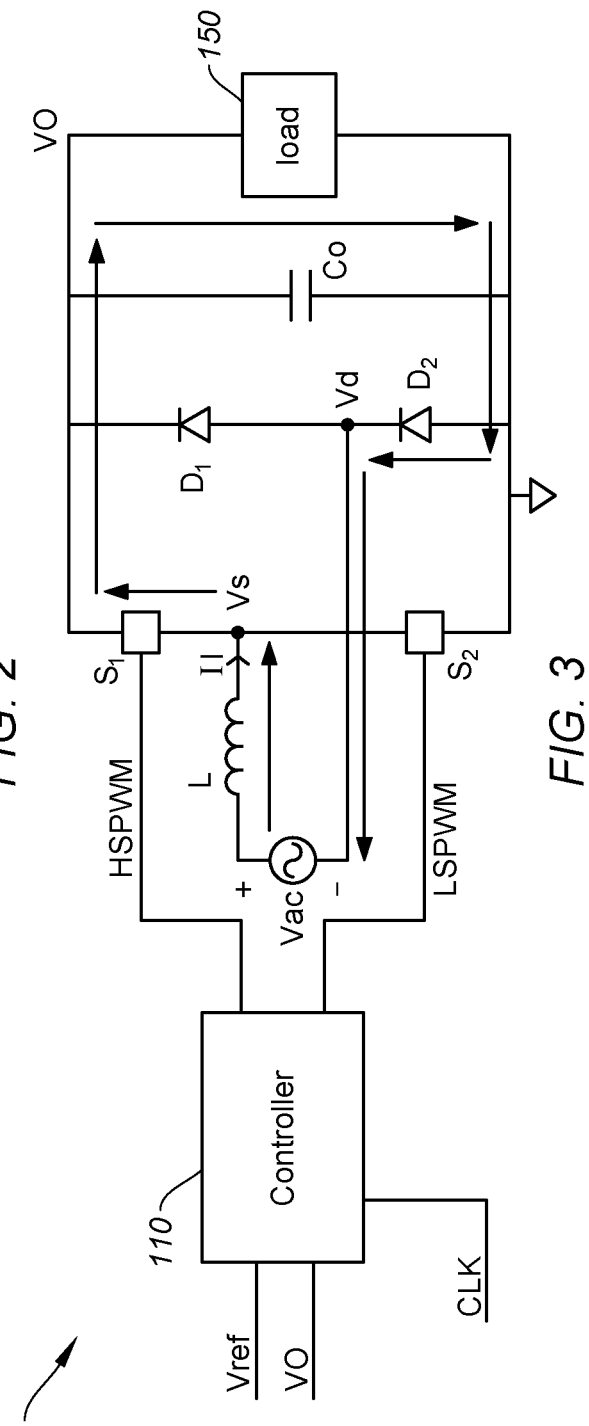
FIG. 3 is a simplified schematic illustration of an operating condition of the circuit of FIG. 1.

FIG. 3 is a simplified schematic illustration of an operating condition of the circuit of FIG. 1. While operating in the condition illustrated in FIG. 3, the AC power input signal is positive, high side switch S1 is conductive, and low side switch S2 is nonconductive.

Accordingly, as indicated in FIG. 3, the current flows through power conversion circuit 100 from the positive terminal of AC source of Vac through inductor L, through high side switch S1 in a negative direction, and to the positive plate of capacitor Co. In addition, current flows from the negative plate of capacitor Co, through diode D2, and to the negative terminal of AC source Vac.

While operating in the illustrated condition, in response to receiving an open control signal from controller 110 because the polarity of the AC power input signal is positive, high side switch S1 does not immediately become nonconductive. Instead, high side switch S1 becomes nonconductive after additionally experiencing an electrical condition that the positive current flowing through high side switch S1 is greater than a threshold. Or, using the convention illustrated in FIG. 2, high side switch becomes nonconductive after additionally experiencing an electrical condition that the negative current flowing through high side switch S1 is less than a threshold.

Figure 4:
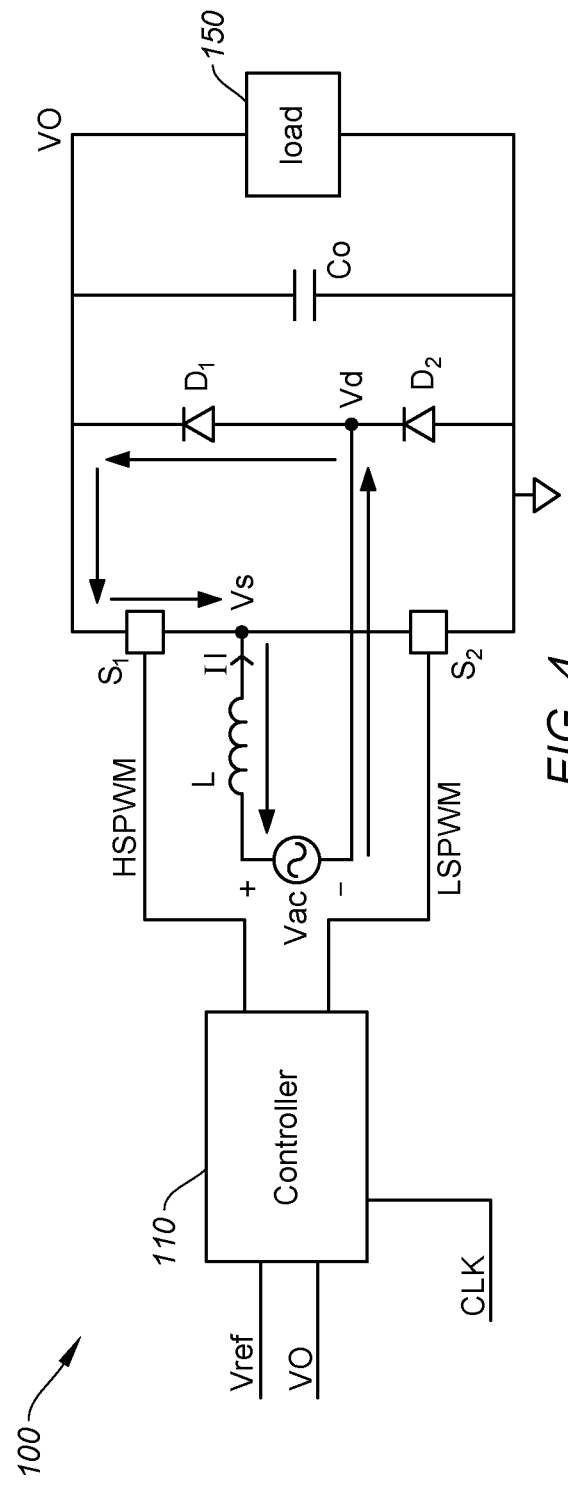
FIG. 4 is a simplified schematic illustration of an operating condition of the circuit of FIG. 1.

FIG. 4 is a simplified schematic illustration of an operating condition of the circuit of FIG. 1. While operating in the condition illustrated in FIG. 4, the AC power input signal is negative, high side switch S1 is conductive, and low side switch S2 is nonconductive.

Accordingly, as indicated in FIG. 4, the current flows through power conversion circuit 100 from the negative terminal of AC source of Vac through diode D1, through high side switch S1 in a positive direction, through inductor L, and to the positive terminal of AC source Vac.

While operating in the illustrated condition, in response to receiving an open control signal from controller 110, because the polarity of the AC power input signal is negative, current flows in the indicated direction, and high side switch S1 immediately or substantially immediately becomes nonconductive, or becomes nonconductive regardless of the state of an electrical condition of high side switch S1 which would cause a delay in other operating conditions. An embodiment of a switch which can be used as high side switch S1 is discussed below with reference to FIG. 6.

Figure 5:
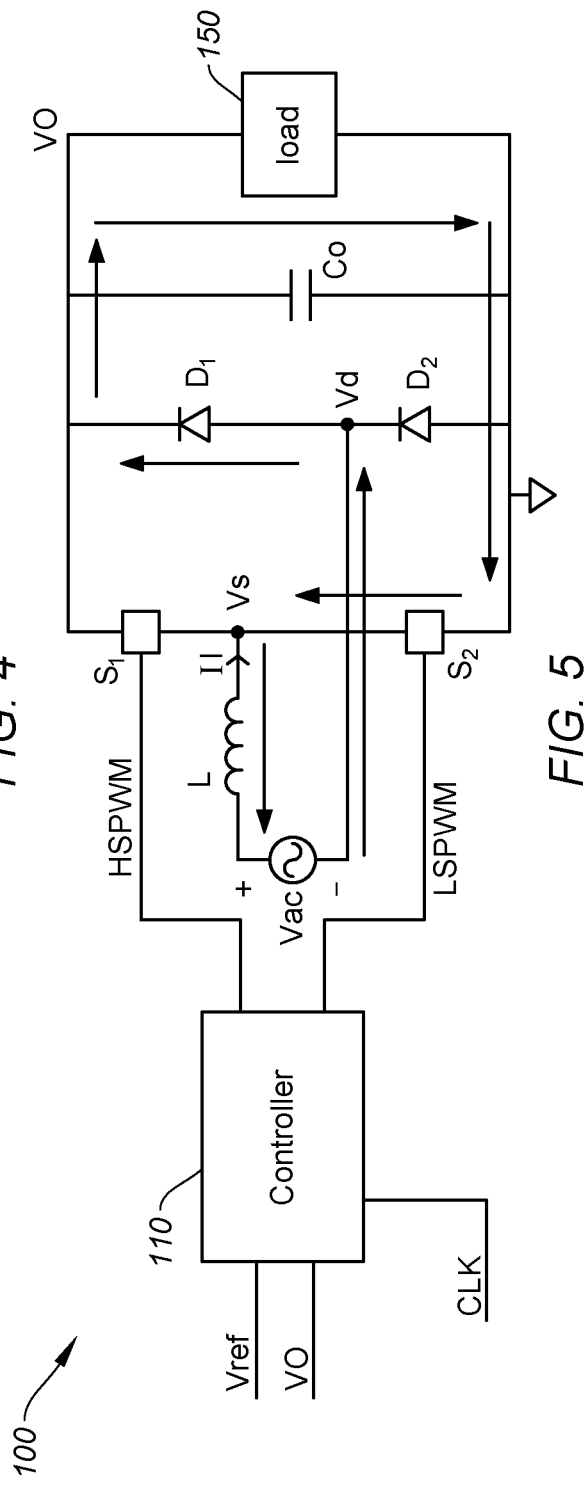
FIG. 5 is a simplified schematic illustration of an operating condition of the circuit of FIG. 1.

FIG. 5 is a simplified schematic illustration of an operating condition of the circuit of FIG. 1. While operating in the condition illustrated in FIG. 5, the AC power input signal is negative, high side switch S1 is nonconductive, and low side switch S2 is conductive.

Accordingly, as indicated in FIG. 5, the current flows through power conversion circuit 100 from the negative terminal of AC source of Vac through diode D1, and to the positive plate of capacitor Co. In addition, current flows from the negative plate of capacitor Co, through low side switch S2 in a negative direction, through inductor L, and to the positive terminal of AC source Vac.

While operating in the illustrated condition, in response to receiving an open control signal from controller 110, because the polarity of the AC power input signal is negative, low side switch S2 does not immediately become nonconductive. Instead, low side switch S2 becomes nonconductive after additionally experiencing an electrical condition that the positive current flowing through low side switch S2 is greater than a threshold. Or, using the convention illustrated in FIG. 2, low side switch S2 becomes nonconductive after experiencing an electrical condition that the negative current flowing through low side switch S2 is less than a threshold.

Figure 6:
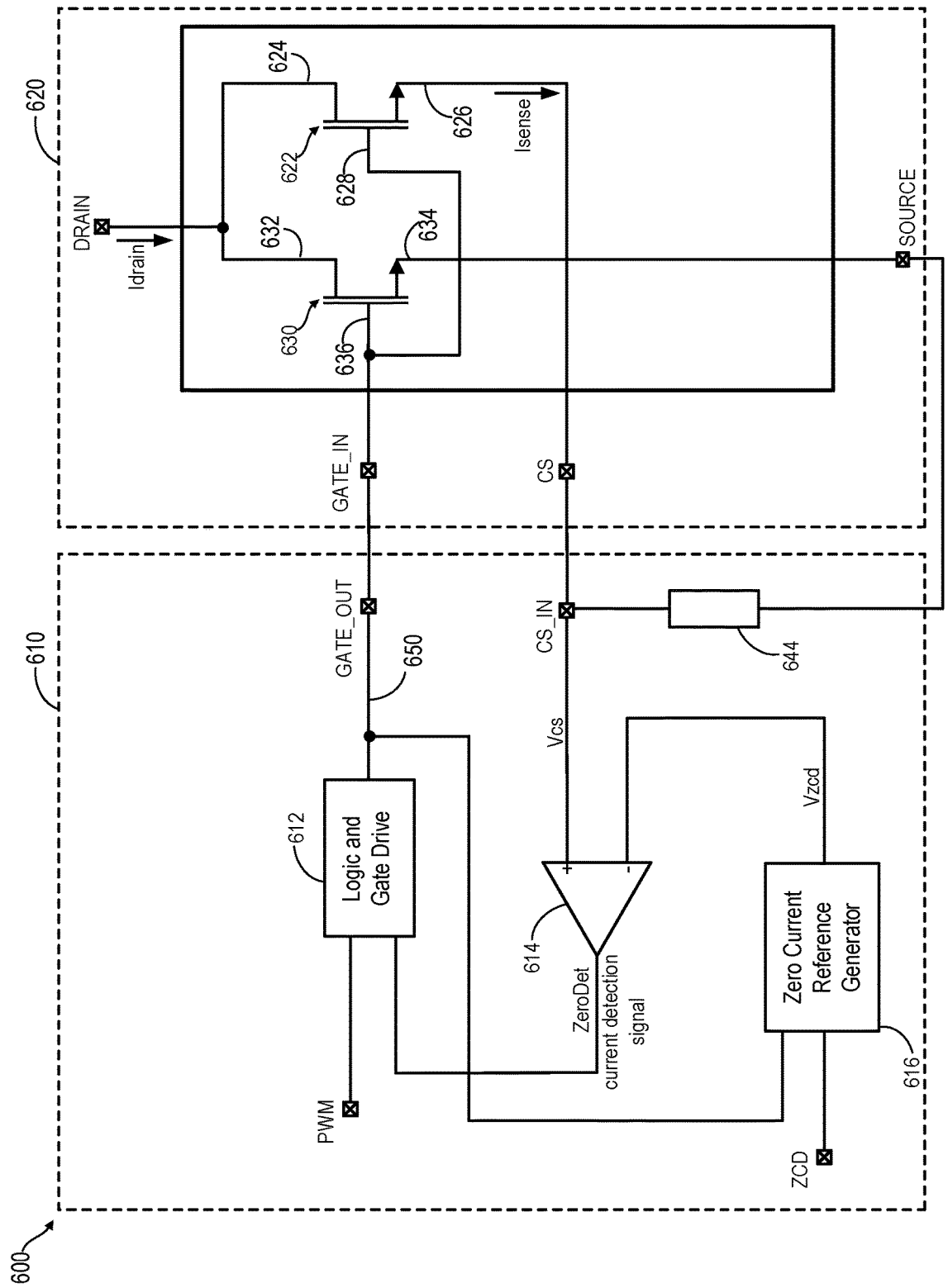
FIG. 6 is a simplified schematic illustration of a variable current threshold switching switch circuit according to an embodiment of the disclosure.

FIG. 6 is a simplified schematic illustration of a variable current threshold switching switch circuit 600 according to an embodiment of the disclosure. In switch circuit 600, a threshold value used for detecting a current condition for switching can be variable, and be based on an input line voltage. In some embodiments, the threshold value can be based on a difference between a value of the output voltage VO in circuit 100 and the input line voltage. Switch circuit 600 can include a drive circuit 610 and current sensing switch circuit 620. Current sensing switch circuit 620 can include a first switch 630 and a second switch 622. In some embodiments, the first switch 630 may be a power field effect transistor (FET) capable of carrying relatively large currents, and the second switch 622 may be a sense FET, capable of sensing a relatively small portion of the total current flowing through the current sensing switch circuit 620. A ratio of a size of an active area of the switch 622 to a size of an active area of the switch 630 can be less than 1.0. In various embodiments, the first switch 630 and the second switch 622 can be integrated on the same die. In some embodiments, the first switch 630 and the second switch 622 can be GaN-based transistors integrated on the same die. Switch circuit 600 may be used as either or both of high side switch S1 and low side switch S2 in power conversion circuit 100 of FIGS. 1-5.

In some embodiments, switch circuit 600 can be formed in silicon, GaN or any other suitable semiconductor material. In various embodiments, both the drive circuit 610 and the switch circuit 620 can be formed in a silicon substrate. In some embodiments, both the drive circuit 610 and the switch circuit 620 can be formed in a GaN substrate. In some embodiments, the drive circuit 610 can be formed in a silicon substrate while the switch circuit 620 can be formed in a GaN substrate. In various embodiments, both drive circuit 610 and switch circuit 620 can be monolithically integrated onto a single die. In some embodiments, the drive circuit 610 and the switch circuit 620 can be formed on separate individual die. In various embodiments, the drive circuit 610 and the switch circuit 620 can be integrated into one electronic package, for example, but not limited to, into a quad-flat no-lead (QFN) package, or into a dual-flat no-leads (DFN) package, into a ball grid array (BGA) package. In some embodiments, the drive circuit 610 and the switch circuit 620 can be individually packaged into an electronic package.

In some embodiments, the first switch 630 can have a first gate terminal 636, a first drain terminal 632 and a first source terminal 634. The second switch 622 can have a second gate terminal 628, a second drain terminal 624 and a second source terminal 626. The first gate terminal 636 can be connected to the second gate terminal 628, where both gates are connected to a GATE_IN terminal, the first drain 632 can be connected to the second drain terminal 624, where both drains are connected to a drain terminal DRAIN, and the first source terminal 634 can be connected to the second source terminal 626, where both sources are connected to a source terminal SOURCE. In various embodiments, Current sensing switch circuit 620 is selectively conductive between its drain terminal DRAIN and its source terminal SOURCE according to a gate control signal at its gate terminal GATE_IN. Current sensing switch circuit 620 is also configured to generate a current sense signal at its current sense terminal CS. The current sense signal can be generated by having a sensing current Isense, which flows through the second switch 622, flow through a current sensing device 644. Current sensing device 644 can be connected between the terminal CS_IN and the SOURCE terminal. In this way, a voltage can be generated indicating a value of the current being conducted between the drain terminal DRAIN and the source terminal SOURCE. In some embodiments, the current sensing device 644 can be a resistor, while in alternative embodiments the current sensing device 644 can be a FET.

Drive circuit 610 can include logic and gate drive circuit 612, comparator 614, and a zero current reference generator 616.

Zero current reference generator 616 may receive a reference voltage at node ZCD. Zero current reference generator 616 may further receive a PWM indication signal corresponding with the gate control signal of the current sensing switch circuit 620. In some embodiments, the reference voltage at node ZCD can be generated based on a current sourced by zero current reference generator 616 to a resistor (not shown), such as a resistor which is external to a chip having zero current reference generator 616 formed thereon.

Based on the reference voltage at node ZCD and the PWM indication signal, zero current reference generator 616 can generate a reference voltage Vzcd. An embodiment of a zero current reference generator 616 is discussed in further detail below in FIG. 10.

In some embodiments, a PWM indication signal can be generated at the node 650. In alternative embodiments, zero current reference generator 616 may generate a current sense reference voltage that is not based on the PWM indication signal.

Comparator 614 can receive a current sense signal Vcs from the current sensing switch circuit 620, and can receive a current sense reference voltage Vzcd from the zero current reference generator 616. Comparator 614 can generate a current detection signal based on the current sense signal Vcs and the current sense reference voltage Vzcd. In response to the current sense signal Vcs being greater than the current sense reference voltage Vzcd, comparator 614 can generate a current detection signal indicating that a positive current is flowing from the drain to the source of the current sensing switch circuit 620, and that a value of the current is greater than a current threshold, or that a negative current is flowing from the drain to the source of the current sensing switch circuit 620, and that a value of the current is less than the current threshold. In response to the current sense signal Vcs being less than the current sense reference voltage Vzcd, comparator 614 can generate a current detection signal indicating that a positive current is flowing from the drain to the source of the current sensing switch circuit 620, and that a value of the current is less than the current threshold, or that a negative current is flowing from the drain to the source of the current sensing switch circuit 620, and that a value of the current is greater than the current threshold.

Logic and gate drive circuit 612 receives a PWM signal, for example, from a controller, such as controller 110. Logic and gate drive circuit 612 also receives the current detection signal from comparator 614. In response to the PWM signal indicating that the switch circuit 600 is to be nonconductive, logic and gate drive circuit 612 generates an open output signal for current sensing switch circuit 620 only after the current detection signal additionally indicates that the positive current flowing from the drain to the source of the current sensing switch circuit 620 is greater than a current threshold, or that the negative current flowing from the drain to the source of the current sensing switch circuit 620 is less than the current threshold. In response to the PWM signal indicating that the switch circuit 600 is to be conductive, logic and gate drive circuit 612 generates a conduct output signal for current sensing switch circuit 620 causing current sensing switch circuit 620 to be conductive, where the conduct output signal is generated regardless of the state of the current detection signal.

In some embodiments, drive circuit 610 is integrated on a first die or integrated circuit chip, and current sensing switch circuit 620 is integrated on a second die or integrated circuit chip. For example, the first die or integrated circuit chip may include a silicon semiconductor substrate, and the second die or integrated circuit chip may include a gallium nitride (GaN) semiconductor substrate.

In some embodiments, the reference voltage at node ZCD can be used to cause the logic and gate drive circuit 612 to generate a GATE_OUT signal which is a delayed version of the signal at the node PWM. For example, a voltage at node ZCD may cause the voltage at node Vzcd to be equal to the ground voltage. In some embodiments, drive circuit 610 can include a comparator 614, which provides a signal to logic and gate drive circuit 612 causing the logic and gate drive circuit 612 to generate a GATE_OUT signal which is a delayed version of the signal at the node PWM in response to the voltage at node ZCD being greater than a reference voltage.

Figure 7:
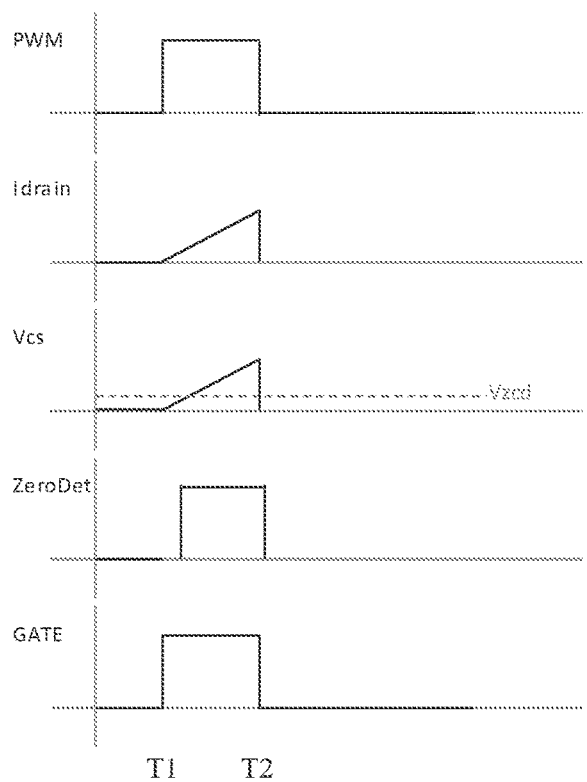
FIG. 7 is a simplified schematic illustration of control mode operation of the circuit of FIG. 6.

FIG. 7 is a simplified schematic illustration of operation of the threshold switching switch circuit 600 of FIG. 6, where circuit 600 operates in control mode.

At time T1, the PWM signal goes high, indicating that the switch circuit 600 is to be conductive. In response, logic and gate drive circuit 612 generates a high GATE_OUT signal that can be received by the current sensing switch circuit 620 at GATE_IN node causing current sensing switch circuit 620 to be conductive. The high GATE_OUT signal is generated regardless of the state of the current detection signal.

In response to the current sensing switch circuit 620 being conductive, the drain to source current Idrain of the current sensing switch circuit 620 increases. In addition, the current sense signal Vcs generated by current sensing switch circuit 620 also increases. Furthermore, once the current sense signal Vcs is greater than the threshold voltage Vzcd generated by zero current reference generator 616, the current detection signal indicates that the positive current flowing from the drain to the source of the current sensing switch circuit 620 is greater than a current threshold.

At time T2, the PWM signal goes low, indicating that the switch circuit 600 is to be or become nonconductive. In response, logic and gate drive circuit 612 generates a low GATE_OUT signal for current sensing switch circuit 620 causing current sensing switch circuit 620 to be nonconductive. The high GATE_OUT signal is generated substantially immediately because the current detection signal already indicates that the positive current flowing from the drain to the source of the current sensing switch circuit 620 is greater than a current threshold.

Accordingly, when switch 600 is used as either the high side switch S1 or the low side switch S2 of power conversion circuit 100, and operates as described above with reference to FIG. 7, the high side switch S1 or the low side switch S2 behaves as a control FET of the power conversion circuit 100.

Figure 8:
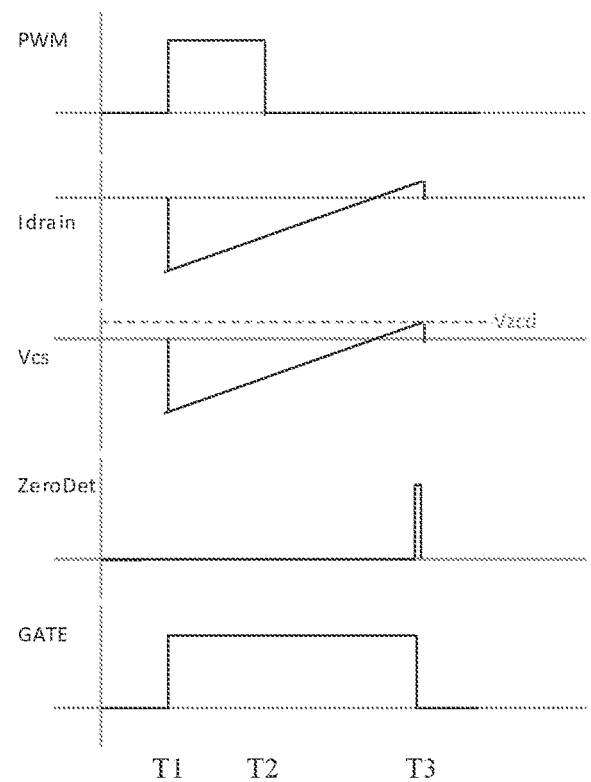
FIG. 8 is a simplified schematic illustration of synchronous mode operation of the circuit of FIG. 6.

FIG. 8 is a simplified schematic illustration of operation of the threshold switching switch circuit 600 of FIG. 6, where circuit 600 operates in sync mode.

At time T1, the PWM signal goes high, indicating that the switch circuit 600 is to be conductive. In response, logic and gate drive circuit 612 generates a high GATE_OUT signal that can be received by the current sensing switch circuit 620 at GATE_IN node causing current sensing switch circuit 620 to be conductive. The high GATE_OUT signal is generated regardless of the state of the current detection signal.

In response to the current sensing switch circuit 620 being conductive, the drain to source current Idrain of the current sensing switch circuit 620 increases from an initial negative value. In addition, the current sense signal Vcs generated by current sensing switch circuit 620 also increases.

At time T2, the PWM signal goes low, indicating that the switch circuit 600 is to be or become nonconductive. Logic and gate drive circuit 612 does not generate a low GATE_OUT signal for current sensing switch circuit 620 causing current sensing switch circuit 620 to be nonconductive in response to the PWM signal going low because the current sense signal Vcs is less than the threshold voltage Vzcd generated by zero current reference generator 616.

At time T3, the current sense signal Vcs becomes greater than the threshold voltage Vzcd, and the current detection signal indicates that the positive current flowing from the drain to the source of the current sensing switch circuit 620 is greater than a current threshold. In response to both the low level of the PWM signal and the current detection signal, logic and gate drive circuit 612 generates a low GATE_OUT signal for current sensing switch circuit 620 causing current sensing switch circuit 620 to be nonconductive.

Accordingly, when switch 600 is used as either the high side switch S1 or the low side switch S2 of power conversion circuit 100, and operates as described above with reference to FIG. 8, the high side switch S1 or the low side switch S2 behaves as a sync FET of the power conversion circuit 100.

Therefore, when instances of switch 600 are used as both the high side switch S1 and the low side switch S2 of power conversion circuit 100, each of the high side switch S1 and the low side switch S2 automatically operate as described above with reference to FIG. 7 and FIG. 8, alternately, according to the automatic detection of when the positive current flowing from the drain to the source of the current sensing switch circuit 620 is greater than the current threshold with respect to the PWM signal going low. Therefore, in these embodiments, each of the high side switch S1 and the low side switch S2 can automatically function or can be controlled to automatically function as a sync FET of the power conversion circuit 100 and as a control FET of the power conversion circuit 100, alternately.

For example, when power conversion circuit 100 operates under the condition described with reference to FIG. 2, low side switch S2 may operate as a control FET and high side switch S1 may operate as a sync FET. Additionally, when power conversion circuit 100 operates under the condition described with reference to FIG. 3, low side switch S2 may operate as a control FET and high side switch S1 may operate as a sync FET. Furthermore, when power conversion circuit 100 operates under the condition described with reference to FIG. 4, low side switch S2 may operate as a sync FET and high side switch S1 may operate as a control FET, and when power conversion circuit 100 operates under the condition described with reference to FIG. 5, low side switch S2 may operate as a sync FET and high side switch S1 may operate as a control FET.

In some embodiments, based on the value of the input voltage across AC source Vac, and/or based on the value of the corresponding current sense signal Vcs, the controller 110 of power conversion circuit 100 can ensure that the PWM signal goes low for the switch operating as the control FET when or about when the switch operating as the control FET is to turn off, as illustrated in FIG. 7. In addition, the controller 110 of power conversion circuit 100 may ensure that the PWM signal goes low for the switch operating as the sync FET before the switch operating as the sync FET is to turn off, as illustrated in FIG. 8. For example, the controller 110 of power conversion circuit 100 may ensure that the PWM signal goes low for the switch operating as the sync FET while the corresponding current sense signal Vcs indicates that drain current is negative in the switch operating as the sync FET, as illustrated in FIG. 8.

Accordingly, in some embodiments, the pulse widths of the PWM signals may be different according to whether the switch turned on by the pulse of the PWM signal is operating as a sync FET or a control FET. For example, the pulse widths of the PWM signals turning on a sync FET may be shorter than the pulse widths of the PWM signals turning on a control FET. The pulse widths of the PWM signals controlling a FET that is operating in sync mode may be shorter because a FET that is operating in sync mode can automatically and autonomously determine its turn-off time, i.e. a falling edge of the PWM signal received from a controller is not determinative for a sync FET. Rather, the sync FET can monitor a current flowing through its drain to source and turn off when the current changes direction, i.e. the current flows backward through inductor L), and reaches a magnitude determined by an instantaneous value of a line voltage. In some embodiments, the magnitude of the current may further be determined by a resistor, such as an external resistor.

In various embodiments, the pulse widths of the PWM signals may be the same or substantially the same regardless of whether the switch turned on by the pulse of the PWM signal is operating as a sync FET or a control FET, as understood by those of skill in the art.

In some embodiments, each of a series of consecutive PWM signals go low before the corresponding current sense signal Vcs becomes greater than the threshold voltage Vzcd for both the high side switch S1 and the low side switch S2 of power conversion circuit 100. In these embodiments, the high side switch S1 and the low side switch S2 behave as sync FETs of the power conversion circuit 100, as understood by those of skill in the art.

Figure 9:
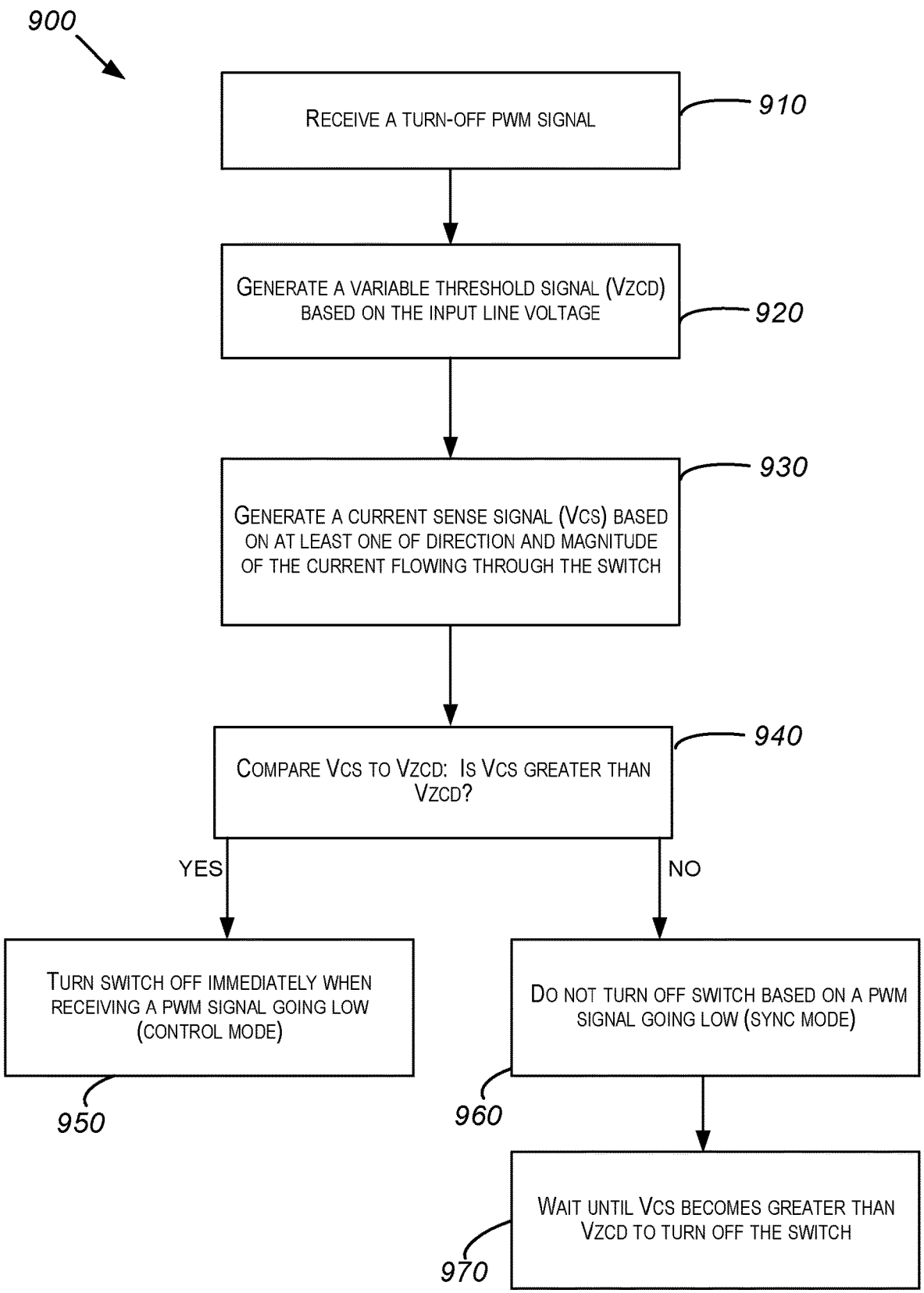
FIG. 9 illustrates a flowchart of an exemplary method for determining a state of a power switch, and a power switch turn-off method according to an embodiment of the disclosure.

FIG. 9 illustrates a flowchart of an exemplary method 900 for determining a state of a power switch in a converter circuit, and a power switch turn-off method in the according to an embodiment of the disclosure. At block 910, a turn-off PWM signal is received by a switch circuit, i.e. the PWM signal goes low. At block 920, the switch can generate a threshold signal (Vzcd) that is based on an input line voltage. This threshold signal can vary with varying input line voltage. For example, in a bridgeless PFC circuit, the input voltage Vac may vary causing a threshold signal Vzcd to vary according to an instantaneous value of Vac. When input voltage Vac has relatively high values, for example 240 V, a value of signal Vzcd can be relatively high. In this way the amount of energy that is used to bring the switch node Vs down to ground can depend on the input line voltage Vac such that an optimized amount of current will be allowed to flow into the inductor L.

Determining an optimized amount of energy that is used to bring the switch node Vs down to ground can enable zero voltage switching (ZVS) in the power converter, resulting in improved efficiency of the power converter. When the input line voltage Vac is at its peak, more current can be allowed to flow into the inductor L, such that relatively higher charge in the inductor L can be used to transition the switch node Vs from a relatively high voltage, for example 400 V, to ground. Embodiments of the disclosure implement a variable threshold signal generator that can allow the switch circuit to determine a turn-off point for the current flowing to the inductor L in sync mode. The variable threshold signal can depend on the input line voltage. Thus, at relatively high input voltages Vac the switch circuit can allow an increased amount of reverse current to flow into the inductor L, and at relatively low input line voltages the switch circuit can allow a reduced amount of reverse current to flow into the inductor L.

At block 930, the switch circuit can generate a current sense signal that is based on at least one of direction and magnitude of the current flowing through the switch. The current sense signal can be generated by sampling a relatively small amount of current through the switch circuit and feeding it into a current sensing device 644.

At block 940, a value of the current sense signal can be compared to a value of the threshold signal. In some embodiments, a comparator circuit may be utilized to perform this comparison. If the value of the current sense signal is greater than the value of the threshold signal, the switch circuit can turn off immediately in response to the PWM signal going low at block 950. If the value of the current sense signal is not greater than the value of the threshold signal, the switch circuit may not turn off immediately in response to the PWM signal going low at block 960. The switch circuit may wait until the value of the current sense signal becomes greater than value of the threshold signal, where at that point the switch circuit turns off at block 970.

It will be appreciated that method 900 is illustrative and that variations and modifications are possible. Steps described as sequential may be executed in parallel, order of steps may be varied, and steps may be modified, combined, added or omitted.

Figure 10:
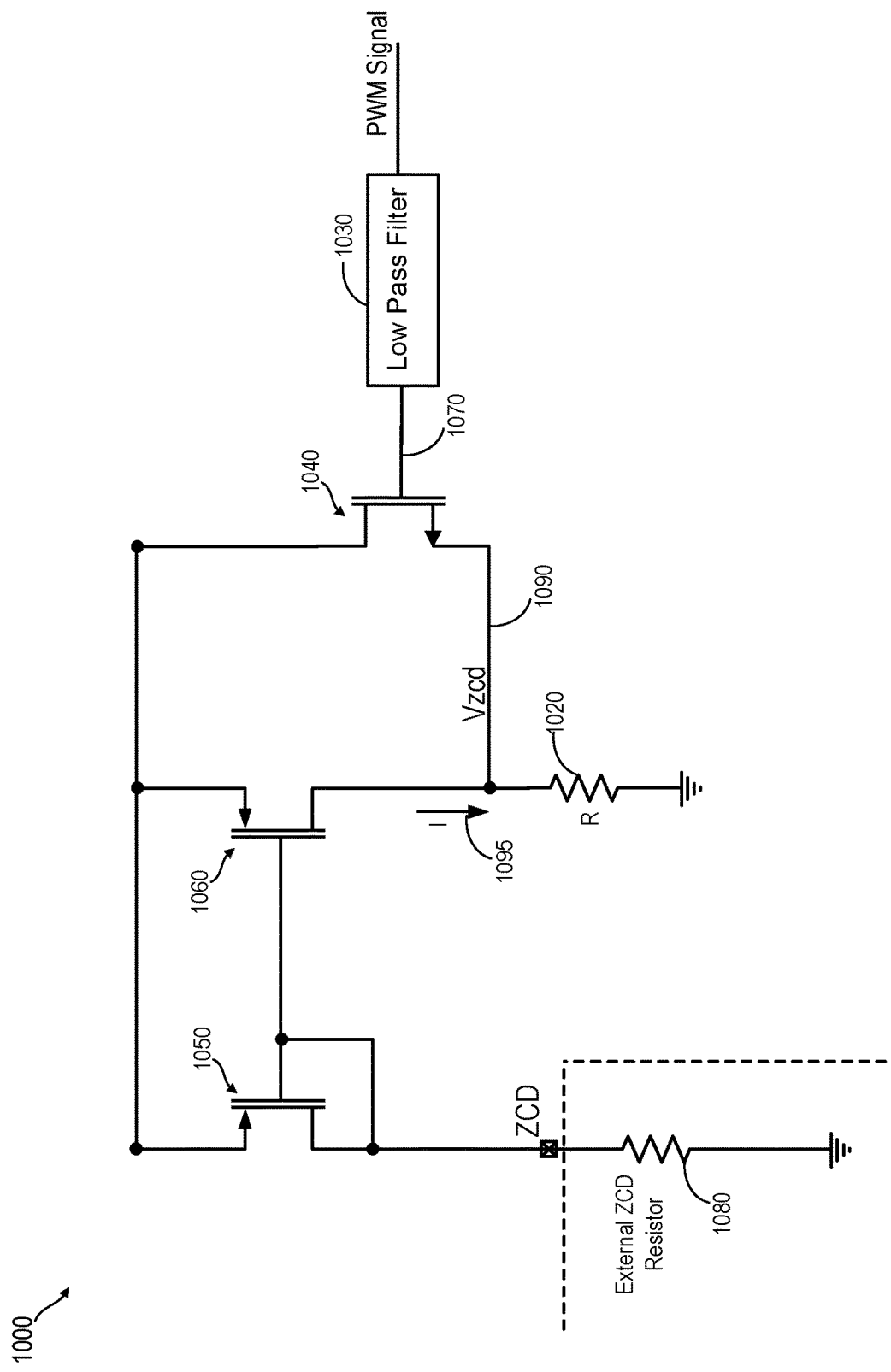
FIG. 10 is a simplified schematic illustration of a zero current reference voltage generator according to an embodiment of the disclosure.

FIG. 10 is a simplified schematic illustration of a zero current reference voltage generator 1000 according to an embodiment of the disclosure. Zero current reference voltage generator 1000 may be used as zero current reference generator 616 of FIG. 6 to generate a reference voltage Vzcd. In some embodiments, a resistor 1080 may be used to set a value of Vzcd. In some embodiments, resistor 1080 may not integrated on the same die as the other elements of zero current reference voltage generator 1000. Zero current reference voltage generator 1000 can include resistor 1020 having a resistance value of R, low-pass filter circuit 1030, and switches 1040, 1050 and 1060. Switches 1040, 1050 and 1060 may be FETs. In various embodiments, switch 1040 may be an N-MOSFET, while switches 1050 and 1060 may be P-MOSFETs. Switches 1050 and 1060 can be arranged in a current mirror configuration. Alternative reference voltage generators may be used.

Low-pass filter circuit 1030 may be any low pass filter circuit, as understood by those of skill in the art. Low-pass filter circuit 1030 can receive a PWM signal, and can generate an output at node 1070 corresponding to a duty cycle of the received PWM signal. In some embodiments, such as that illustrated in FIG. 6, the received PWM signal can be the GATE_OUT signal at node GATE_OUT. In alternative embodiments, the received PWM signal may be the PWM indication signal at node PWM illustrated in FIG. 6. In some embodiments, a control signal may be used as the received PWM signal.

In the illustrated embodiment, an external ZCD resistor can be connected to the switch 1050 that is arranged in a diode connected configuration. A current through switch 1050 and the resistor 1080 may be mirrored to generate current 1095 (I) through switch 1060 and resistor 1020. The voltage at node 1090 (Vzcd) will be equal to the I*R. As pulse widths of the PWM signal gets longer, the voltage at node 1070 may increase. When the voltage at node 1070 exceeds a value equal to I*R plus the threshold voltage of switch 1040, the voltage at node 1090 may start to increase. In this way, a modulation of Vzcd with PWM duty cycle can be achieved. Further, Vzcd can track the input line voltage because the PWM duty cycle can be a proxy for the input line voltage when the output voltage VO is fixed. In some embodiments, when the output voltage VO is not fixed, the PWM duty cycle can be a proxy for a difference between output voltage VO and the input line voltage. Thus, Vzcd can be a function of the input line voltage and the output voltage VO. It will be understood by those skilled in the art having the benefit of this disclosure that alternative methods to affect a modulation of Vzcd based on the input line voltage can be used, and that those methods are within the scope of the disclosure.

Therefore, in response to the PWM signal having a relatively low duty cycle, zero current reference voltage generator 1000 can generate a relatively low reference voltage value at output node Vzcd. Similarly, in response to the PWM signal having a relatively high duty cycle, zero current reference voltage generator 1000 may generate a relatively high reference voltage value at output node Vzcd.

A beneficial result of the zero current reference voltage generator 1000 generating a PWM signal dependent reference voltage value is that the reference voltage value may be modified so as to reduce or eliminate or substantially eliminate excessive current used to charge or discharge node Vs, where node Vs is the connection node between switches S1 and S2.

During times when both switch S1 and switch S2 are off, current through inductor L can cause a voltage at node Vs to either increase or decrease, depending on the direction of the current. At least to reduce noise, switching loss, and conduction loss, switch S2 is optimally turned on when the voltage at node Vs has decreased to be equal to the ground voltage. Similarly, at least to reduce noise, switching loss, and conduction loss, switch S1 is optimally turned on once the voltage at node Vs has increased to be equal to the output voltage at output node VO.

Insufficient current through inductor L results in switch S1 or switch S2 turning on before the voltage at node Vs has transitioned to either the optimal ground voltage or output voltage. Excessive current through inductor L results in switch S1 or switch S2 turning on after the voltage at node Vs has transitioned beyond either the optimal ground voltage or output voltage. Accordingly, either insufficient or excessive current through the inductor L is undesirable.

A value of the current through inductor L can be affected by the value of the input voltage across AC source Vac during the transitions of the voltage at node Vs. Accordingly, the value of the voltage at node Vs when either switch S2 or switch S1 subsequently turns on can depend on both the value of the input voltage and the current through inductor L when either switch S1 or switch S2 is turned off. Therefore, in order to reduce, or eliminate, or substantially eliminate variation in the value of the voltage at node Vs when either switch S2 or switch S1 subsequently turns on, the relative time when either switch S1 or switch S2 is turned off may be varied to adjust the current through inductor L when either switch S1 or switch S2 is turned off.

For example, if the value of the input voltage is relatively high, the relative time when either switch S1 or switch S2 is turned off may be delayed to allow the current through inductor L when either switch S1 or switch S2 is turned off to increase. Similarly, if the value of the input voltage is relatively low, the relative time when either switch S1 or switch S2 is turned off may be caused to occur earlier to reduce the current through inductor L when either switch S1 or switch S2 is turned off.

In some embodiments, controller 110 can vary the duty cycle of the PWM signal such that the duty cycle of the PWM signal corresponds with the value of the voltage input across AC source Vac. Accordingly, the duty cycle of the PWM signal can be used to influence the reference voltage value at node Vzcd such that the reference voltage value at node Vzcd varies so as modify the current through inductor L when either switch S1 or switch S2 is turned off to reduce, eliminate, or substantially eliminate variation in the duration of the voltage transitions at node Vs caused by variation in input voltage.

A beneficial result of the zero current reference voltage generator 1000 generating a reference voltage value which is dependent on the duty cycle of the PWM signal is that the reference voltage value may be modified so as to reduce or eliminate or substantially eliminate variation in the value of the voltage at node Vs when either switch S2 or switch S1 turns on.

In some embodiments, controller 110 can vary the duty cycle of the PWM signal such that the duty cycle of the PWM signal corresponds with the value of the voltage input across AC source Vac. Accordingly, in some embodiments, the duty cycle of the PWM signal can be used to influence the reference voltage value at node Vzcd such that the reference voltage value at node Vzcd varies so as to eliminate or substantially eliminate variation in the value of the voltage at node Vs when either switch S2 or switch S1 turns on. As a result, energy occurring in the output voltage at node VO at the frequency of the input voltage across AC source Vac is reduced or eliminated, or substantially eliminated.

In addition, because a reference voltage value for Vzcd can be based on I*R, the reference voltage value at output node Vzcd may have a minimum value determined by the current of the current through switch 1060 and the resistor 1020.

Accordingly, in the illustrated embodiment, the reference voltage value generated at output node Vzcd can be modified according to changes in the duty cycle of the PWM signal. In alternative embodiments, a reference voltage value is generated at output node Vzcd which does not change with changes in the duty cycle of the PWM signal. For example, in alternative embodiments, a reference voltage generator may generate a fixed or substantially fixed reference voltage at output node Vzcd.

Embodiments of the present disclosure can enable the power switches to determine their turn-off time independent of the controller 110 when the power switches are operating in sync mode. This is in contrast to the current approaches where a controller may control the on and off times of the power switches. This can put a relatively high computational load on the controller and increase system costs in the current approaches.

Embodiments of the present disclosure, can enable efficient operation of the power converter. The sync switch can stay on beyond a point where a current in the power conversion inductor may reach zero value, such that some reverse current can build up in the power conversion inductor. In this way, when the sync power switch turns off and there is some energy built up in the power conversion inductor, the switch node can softly transition from a relatively high voltage to a relatively low voltage, thereby allowing the control power switch to turn on with zero r substantially zero voltage across it. This allows for zero voltage switching (ZVS) operation, and can improve the operation efficiency of the power convert.

In some embodiments, an amount of energy built up in the power conversion inductor may be a function of the instantaneous value of the input line voltage. In various embodiments, the amount of energy built up in the power conversion inductor may be a function of a difference between a value of the output voltage and the instantaneous value of the input line voltage. In some embodiments, the amount of energy built up in the power conversion inductor can be optimized such that the operational efficiency of the power converter in increased. An optimum amount of the amount of energy built up in the power conversion inductor may be determined by an optimum amount of current that flows through the sync power switch to the power conversion inductor. In various embodiments, the power switch can determine this optimum amount of current autonomously by turning itself off when the current changes direction and when the current reaches a magnitude determined by the instantaneous line voltage.

In some embodiments, the automatic and autonomous determination of a turn-off time of the sync power switch can reduce computational loads on the controller 110 resulting in increased control loop bandwidth and reduced system costs. The controller 110 can get the information regarding the sync mode of operation based on a polarity of the input AC line. The controller 110 may then send a relatively short PWM pulse to the sync power switch. The power switch may turn on when it receives a leading edge of the PWM pulse from the controller 110. When a trailing edge of the PWM pulse is received from the controller 110, the power switch can detect that it is in sync mode and may not turn itself off. The power switch can perform this detection by checking a direction of the current flowing from its drain to its source. If this current is negative, the power switch may ignore the trailing edge of the PWM pulse. The power switch can monitor the current flowing from its drain to its source and may turn off when the current changes direction, i.e. the current flows back into the power conversion inductor, and reaches a value that is proportional to the instantaneous input line voltage. In various embodiments, this value can be proportional to the instantaneous input line voltage and a resistor, such as, but not limited to, an external resistor.

Once the sync power switch turns off, the switch node may softly transition to ground using an energy stored in the power conversion inductor. The sync power switch may send an indication signal to the controller 110 such that after the switch node has reached a value of zero or substantially zero volt, the controller 110 may know that the sync power switch is off and that it is safe to turn on the control power switch and start the next switching cycle.

As described in details above, embodiments of the present disclosure can increase a control loop bandwidth of the power converter resulting in improved performance of the power converter. Further, a relatively simple controller may be used in the power converter thus reducing system costs.

While various embodiments of present invention have been described, it will be apparent to those of skill in the art that many more embodiments and implementations are possible that are within the scope of this invention. Accordingly, the present invention is not to be restricted except in light of the attached claims and their equivalents.

Though the present invention is disclosed by way of specific embodiments as described above, those embodiments are not intended to limit the present invention. Based on the methods and the technical aspects disclosed above, variations and changes may be made to the presented embodiments by those skilled in the art without departing from the spirit and the scope of the present invention.

What is claimed is:

1. A circuit comprising:
  a first circuit including:
   a first switch coupled between a power input node and a first terminal of a load;
   a first current sense device arranged to transmit a first signal including at least one of a magnitude and polarity of a first current through the first switch; and a first driver circuit arranged to transmit first control signals to the first switch based at least in part on a voltage at the power input node and the first signal; and a second circuit including:
a second switch coupled between the power input node and a second terminal of the load;
a second current sense device arranged to transmit a second signal including at least one of a magnitude and polarity of a second current through the second switch; and
a second driver circuit arranged to transmit second control signals to the second switch based at least in part on the voltage at the power input node and the second signal.

2. The circuit of claim 1, wherein the first switch is a gallium nitride (GaN) based switch.

3. The circuit of claim 1, wherein the second switch is a gallium nitride (GaN) based switch.

4. The circuit of claim 1, wherein the first driver circuit comprises a first threshold generation circuit and the second driver circuit comprises a second threshold generation circuit.

5. The circuit of claim 4, wherein the first threshold generation circuit is arranged to generate a first threshold signal based on the voltage at the power input node.

6. The circuit of claim 5, wherein a value of the first threshold signal is based on a duty cycle of a pulse width modulated (PWM) signal received from a controller.

7. The circuit of claim 6, wherein the value of the first threshold signal is high when the duty cycle of the PWM signal is high.

8. The circuit of claim 6, wherein the value of the first threshold signal is low when the duty cycle of the PWM signal is low.

9. The circuit of claim 5, wherein the first driver circuit further comprises a first comparator arranged receive the first threshold signal, and wherein the first comparator is further arranged to compare the first signal to the first threshold signal and generate a first current detection signal.

10. The circuit of claim 1, wherein the second driver circuit further comprises a second comparator arranged receive a second threshold signal, and wherein the second comparator is further arranged to compare the second signal to the second threshold signal and generate a second current detection signal.

11. The circuit of claim 4, wherein the first threshold generation circuit comprises:
a first transistor having a first gate terminal, a first source terminal and a first drain terminal, wherein the first gate terminal is coupled to a first receiving circuit;
a first current mirror having a first input port and a first output port, and arranged to replicate a first current of the first input port to the first output port; and
a first resistor coupled to the first source terminal and to the first output port.

12. The circuit of claim 11, wherein the first receiving circuit comprises a low-pass filter, and wherein the first drain terminal is coupled to a DC power supply.

13. A method of operating a circuit, the method comprising:
providing a first circuit including:
a first power switch;
a current sensor arranged to transmit a first signal indicating at least one of a magnitude and polarity of a first current through the first power switch; and
a first driver circuit arranged to transmit first control signals to the first power switch based at least in part on a voltage at a power input node and the first signal;
providing a second circuit including:
a second power switch;
a second current sensor arranged to transmit a second signal indicating at least one of a magnitude and polarity of a second current through the second power switch; and
a second driver circuit arranged to transmit second control signals to the second power switch based at least in part on the voltage at the power input node and the second signal;
receiving pulse width modulated (PWM) control signals for controlling operation of the first and second power switches;
generating a first reference voltage based on the voltage of the power input node; and
transmitting a first turn-off signal to the first power switch.

14. The method of claim 13, wherein transmitting the first turn-off signal to the first power switch occurs when the first signal is higher than the first reference voltage and when a first controller turn-off signal is received by the first power switch.

15. The method of claim 14, further comprising transmitting a second turn-off signal to the second power switch when the second signal is high than a second reference voltage and when a second controller turn-off signal is received by the second power switch.

16. The method of claim 13, wherein the generating the first reference voltage based on the voltage of the power input node comprises:
receiving PWM control signals; and
generating the first reference voltage based on a value of a resistance of a first resistor and a duty cycle of the PWM control signals.

17. The method of claim 16, wherein the generating the first reference voltage based on the voltage of the power input node further comprises:
sending the received PWM control signals through a low-pass filter and generating a first voltage corresponding to the duty cycle of the received PWM control signals;
applying the first voltage to a gate terminal of a first transistor to modulate a first current through the first transistor;
sending the modulated first current through the first transistor to the first resistor; and
summing, by the first resistor, the modulated first current through the first resistor with a current from a first current mirror.

18. The method of claim 17, further comprising selectively connecting the power input node to a first terminal of a load and to a second terminal of the load.

19. The method of claim 18, wherein the connecting of the power input node to the first terminal of the load is performed when a drain terminal of the first power switch is approximately equal to a voltage at the first terminal of the load.

20. The method of claim 19, wherein the connecting of the power input node to the second terminal of the load is performed when a source terminal of the second power switch is approximately equal to a voltage at the second terminal of the load.

* * * * *